US009108422B2

(12) United States Patent
Walsh et al.

(10) Patent No.: US 9,108,422 B2
(45) Date of Patent: Aug. 18, 2015

(54) ACCUMULATOR BAG AND CARRIER SHEET FOR USE IN MANUFACTURING PRINTER CARTRIDGES AND METHODS OF MAKING SAME

(71) Applicant: Avery Dennison Corporation, Pasadena, CA (US)

(72) Inventors: John Walsh, Medina, OH (US); Dirk Lovelace, Spartansburg, SC (US); Vance P. Mattison, Clinton, SC (US); Paul Janousek, Simpsonville, SC (US)

(73) Assignee: CCL Label, Inc., Framingham, MA (US)

( * ) Notice: Subject to any disclaimer, the term of this patent is extended or adjusted under 35 U.S.C. 154(b) by 0 days.

(21) Appl. No.: 13/632,184

(22) Filed: Oct. 1, 2012

(65) Prior Publication Data

US 2013/0083140 A1  Apr. 4, 2013

Related U.S. Application Data

(60) Provisional application No. 61/541,329, filed on Sep. 30, 2011.

(51) Int. Cl.
    *B31B 19/90*   (2006.01)
    *B41J 2/175*   (2006.01)
    *B32B 37/02*   (2006.01)
    *B31B 1/00*    (2006.01)

(52) U.S. Cl.
    CPC ............. *B41J 2/17556* (2013.01); *B31B 1/00* (2013.01); *B32B 37/02* (2013.01); *B41J 2/17559* (2013.01); *B31B 2219/14* (2013.01); *B31B 2237/10* (2013.01); *B31B 2237/50* (2013.01); *B31B 2241/00* (2013.01); *B41J 2002/17516* (2013.01); *Y10T 156/10* (2015.01); *Y10T 156/1064* (2015.01); *Y10T 156/12* (2015.01)

(58) Field of Classification Search
    USPC ............................................... 347/86; 53/567
    See application file for complete search history.

(56) References Cited

U.S. PATENT DOCUMENTS

| 5,625,005 | A   |   | 4/1997  | Mallya et al.            |
|-----------|-----|---|---------|--------------------------|
| 5,745,137 | A   |   | 4/1998  | Scheffelin et al.        |
| 5,776,044 | A   | * | 7/1998  | Clark ............... 493/215 |
| 6,517,660 | B2  | * | 2/2003  | Ausnit ............ 156/270 |
| 6,523,941 | B2  | * | 2/2003  | Asakawa et al. ....... 347/65 |
| 6,637,864 | B2  | * | 10/2003 | Dewey et al. .......... 347/49 |
| 6,908,422 | B2  | * | 6/2005  | Ichikawa et al. ...... 493/186 |
| 6,941,726 | B2  | * | 9/2005  | Ausnit ............. 53/412 |
| 7,211,036 | B2  | * | 5/2007  | Ausnit ............ 493/394 |

(Continued)

Primary Examiner — Matthew Luu
Assistant Examiner — Lily Kemathe
(74) Attorney, Agent, or Firm — McDonald Hopkins, LLC

(57) ABSTRACT

An apparatus useful in the assembly of printer cartridges includes a plurality of accumulator bags removeably secured to a carrier sheet. Each accumulator bag includes a first polymer film panel and a second polymer film panel welded together to form a pressurizable chamber with an aperture formed in the bag to provide access to the pressurizable chamber. An annular adhesive element is secured to each bag such that an aperture of the annular adhesive element is generally concentric with the aperture of the accumulator bag. The carrier sheet includes an upper adhesive stripe, a lower adhesive stripe, and a silicone stripe. The plurality of accumulator bags is removeably secured to the carrier sheet by adhering an upper portion of each bag to the upper adhesive stripe, adhering a lower portion of each bag to the lower adhesive stripe, and positioning the annular adhesive element in contact with the silicone stripe.

16 Claims, 19 Drawing Sheets

(56) References Cited

U.S. PATENT DOCUMENTS

| | | | |
|---|---|---|---|
| 7,364,283 B2 * | 4/2008 | Nakajima | 347/86 |
| 7,437,805 B2 * | 10/2008 | Berich | 24/399 |
| 7,469,522 B2 * | 12/2008 | Dettwiller | 53/558 |
| 8,167,399 B2 * | 5/2012 | Nakamura | 347/19 |
| 8,404,071 B2 * | 3/2013 | Cope et al. | 156/272.2 |

* cited by examiner

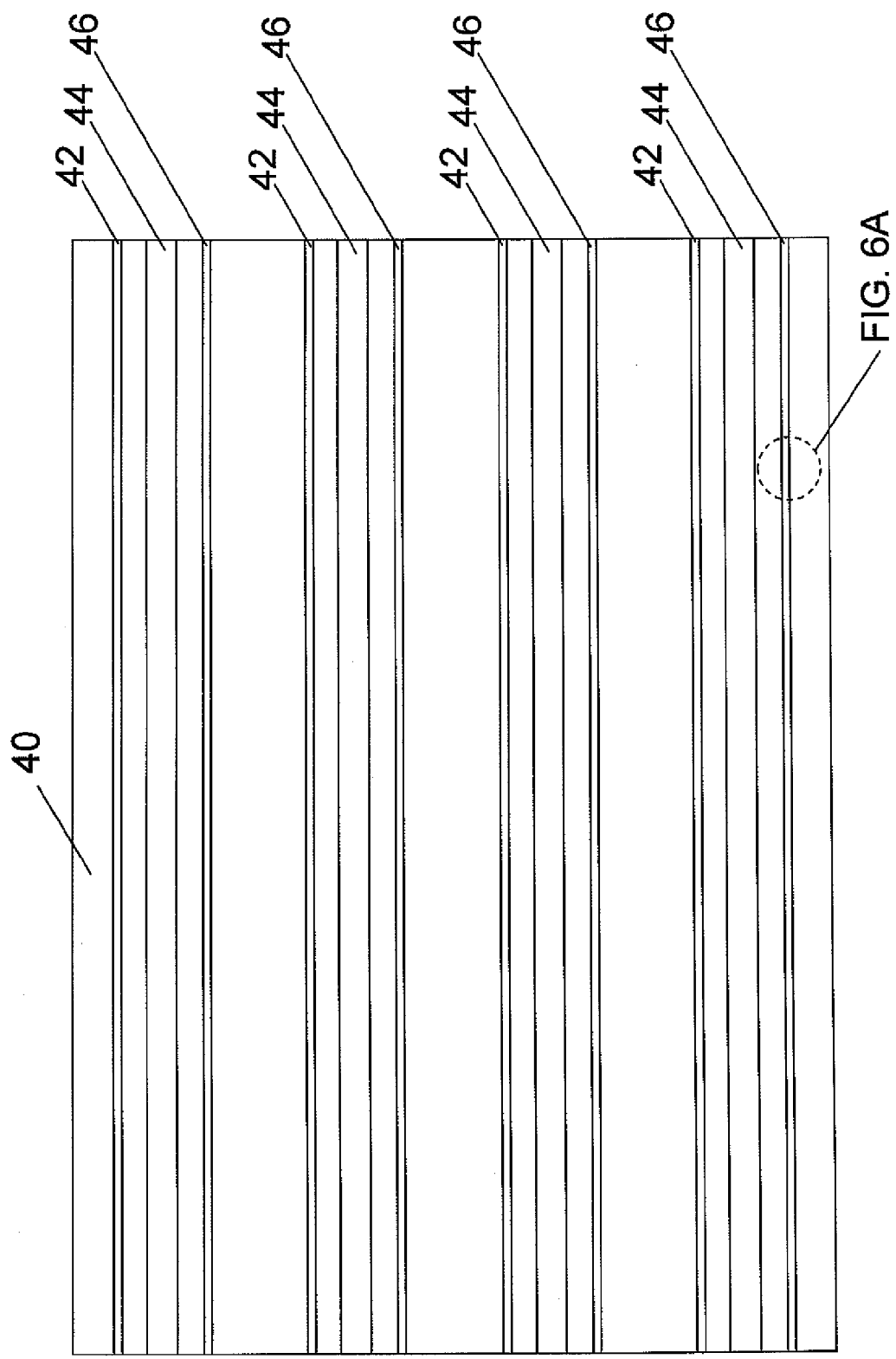

US 9,108,422 B2

ACCUMULATOR BAG AND CARRIER SHEET FOR USE IN MANUFACTURING PRINTER CARTRIDGES AND METHODS OF MAKING SAME

CROSS-REFERENCE TO RELATED APPLICATION

This patent application claims priority to U.S. Provisional Patent Application No. 61/541,329 filed Sep. 30, 2011, the complete text of which is hereby incorporated by reference herein as though fully set forth in its entirety.

TECHNICAL FIELD

This disclosure relates generally to accumulator bags for use in printer cartridges and, more particularly, to accumulator bags removeably secured to a carrier sheet for use during the manufacturing of printer cartridges and methods of making same.

BACKGROUND OF THE INVENTION

Digital and computer controlled printers often utilize printer cartridges to deposit ink onto media such as paper, cardboard, plastics, clothing, and other such materials. Within a printer cartridge, ink is typically stored in an ink reservoir and is deposited onto media through a print head. The printer and, thus, the printer cartridge can be arranged to be in either an idle state or a printing state. While in an idle state, the printer is dormant and awaiting instructions to print. While in a printing state, the printer is processing instructions and actively printing onto media.

The internal pressure of the ink reservoir can be important for both the idle state and the printing state. While in an idle state, the internal pressure of the ink reservoir is typically less than the pressure required to dispense ink through the print head. This is so that ink from the ink reservoir does not unintentionally leak or drop from the print head when the printer is not directed to print. While in a printing state, the internal pressure of the ink reservoir is typically greater than the pressure required to dispense ink through the print head. This is so that ink from the ink reservoir is dispensed through the print head and deposited onto media when the printer is directed to print.

Print cartridges are often equipped with an accumulator assembly to regulate the pressure applied to the ink reservoir. Accumulator assemblies typically include one or more accumulator bags. Accumulator bags can be arranged to apply a generally constant pressure to ink reservoirs during both idle states and printing states. While the printer is in an idle state, an accumulator bag can apply a back pressure to the ink reservoir so that the internal pressure in the ink reservoir is less than the pressure required to dispense ink through the print head. While a printer is in a printing state, an accumulator bag can apply a positive pressure to the ink reservoir so that the internal pressure in the ink reservoir is greater than the pressure required to dispense ink through the print head.

SUMMARY OF THE INVENTION

In accordance with one embodiment, a plurality of accumulator bags is removeably secured to a carrier sheet. Each accumulator bag includes a first polymer film panel and a second polymer film panel welded together along the perimeters of the first and second panels to form a pressurizable chamber within the accumulator bag. The first panel includes an aperture formed therein for providing access to the pressurizable chamber. Each accumulator bag further includes an annular adhesive element adhesively secured to the first panel such that an aperture of the annular adhesive element is generally concentric with the aperture of the first panel. The carrier sheet includes at least one upper adhesive stripe, at least one lower adhesive stripe, and at least one silicone stripe. The upper and lower adhesive stripes are arranged so that the adhering strength of the adhesive stripes allows for polymer materials to be adhered to the upper and lower adhesive stripes and subsequently removed from the stripes without damaging the polymer material. The plurality of accumulator bags is removeably secured to the carrier sheet by adhering an upper portion of the first panel to the upper adhesive stripe, adhering a lower portion of the first panel to the lower adhesive stripe, and positioning the annular adhesive element in contact with the silicone stripe.

In accordance with another embodiment, a method of removeably securing a plurality of accumulator bags to a carrier sheet includes preparing a plurality of accumulator bags, preparing a carrier sheet, and removeably securing the plurality of accumulator bags to the carrier sheet. The accumulator bags are prepared by forming a plurality of apertures in a first polymer film. The first polymer film is positioned on a second polymer film and portions of the first polymer film are welded to the second polymer film so that a plurality of pressurizable chambers are formed between the first and second polymer films. The pressurizable chambers are formed such that each pressurizable chamber coinciding with one of the apertures formed in the first polymer film. A plurality of annular adhesive elements is formed by cutting an annular element with an outer circular perimeter and an inner circular perimeter. An adhesive is applied to a first surface and a second surface of the annular element. Each of the plurality of annular adhesive elements is adhered to the first polymer film such that the inner circular perimeter is generally concentric with one of the apertures formed in the first polymer film. A cutting method is applied to separate the pressurizable chambers into separate accumulator bags. The carrier sheet is prepared by printing a first adhesive stripe, a second adhesive stripe, and a silicone stripe on a base sheet. The accumulator bags are applied to the carrier sheet such that an upper portion of each accumulator bag is placed in contact with the upper adhesive stripe, a lower portion of each accumulator bag is placed in contact with the lower adhesive stripe, and the annular adhesive element in placed in contact with the silicone stripe.

In accordance with another embodiment, an apparatus for manufacturing a transfer tape comprises: (i) at least one unwinder designed to unwind at least one length of transfer tape; (ii) at least one die cutter designed to longitudinally cut the transfer tape into at least two longitudinal portions; (iii) at least one lamination unit designed to individually laminate each of the at least two longitudinally cut transfer tape portions; (iv) at least one stripper unit designed to individually strip each of the at least two longitudinally cut and laminated transfer tape portions; (v) at least one liner and/or carrier unit designed to apply at least one liner and/or carrier individually to each of the at least two longitudinally cut, laminated and stripped transfer tape portions thereby yielding at least two completed transfer tape portions; and (vi) at least two take-up reels designed to individually take-up each of the at least two completed transfer tape portions.

In accordance with another embodiment, an apparatus for manufacturing accumulator bags and removably securing the accumulator bags to a carrier sheet comprises: (a) at least one first unwinder designed to unwind at least one first length of bag material comprising at least one layer of polymer film joined with at least one carrier layer; (b) at least one die designed to create multiple openings at evenly spaced intervals in the at least one first length of bag material, wherein each of the multiple openings in the at least one first length of bag material will individually serve as ink nozzle for an accumulator bag; (c) at least one second unwinder designed to unwind at least one second length of bag material comprising at least one layer of polymer film joined with at least one carrier layer; and (d) at least heat sealing unit designed to join the first length of bag material to the second length of bag material thereby creating a chain of two or more accumulator bags, where each accumulator bag has an individual pressurizable ink chamber formed therein.

In accordance with another embodiment, a method for manufacturing accumulator bags is disclosed wherein the method comprises the steps of: (A) unwinding at least one first length of bag material comprising at least one layer of polymer film joined with at least one carrier layer; (B) creating multiple openings at evenly spaced intervals via at least one die in the at least one first length of bag material, wherein each of the multiple openings in the at least one first length of bag material will individually serve as an ink nozzle for an accumulator bag; (C) unwinding at least one second length of bag material comprising at least one layer of polymer film joined with at least one carrier layer; and (D) heat sealing the first length of bag material to the second length of bag material thereby creating a chain of two or more accumulator bags, where each accumulator bag has an individual pressurizable ink chamber formed therein.

In accordance with another embodiment, a method for manufacturing a bag material-carrier web combination for use in forming an accumulator bag wherein the method comprises the steps of: unwinding a carrier web from at least one first unwinder; unwinding at least one film material from at least one second unwinder; and joining the carrier web to the film material via at least one set of rollers, thereby yielding a combination of a film for one portion of a accumulator bag that is removably secured to a carrier web.

In accordance with another embodiment, an accumulator bag comprises: a first film material, the first film material forming one side of an accumulator bag; a second film material, wherein the second film material forms the opposite side of an accumulator bag; and a carrier web material, wherein the first film material and the second film material are joined to each other so as to form a pressurizable compartment therein, wherein at least one of the first film material or the second film material has a aperture formed therein to permit the inflow and outflow of at least one liquid material, and wherein the carrier web material is removably attached to one side of the accumulator bag.

In accordance with another embodiment, a print cartridge for a printer comprises: a cover; a housing, wherein the cover and the housing can be operatively coupled to one another to form a print cartridge having at least one internal cavity therein, the internal cavity being designed to receive an ink reservoir system and having at least one opening therein to permit any ink contained in the in reservoir system to be supplied to a externally located print head; and an ink reservoir system formed from at least one accumulator bag according to any of the embodiments of the present invention.

BRIEF DESCRIPTION OF THE DRAWINGS

It is believed that certain examples will be better understood from the following description taken in combination with the accompanying drawings in which:

FIG. 6 is a schematic view depicting a carrier sheet;

DETAILED DESCRIPTION OF THE INVENTION

The apparatus and methods disclosed in this document are described in detail by way of examples and with reference to FIGS. 1 to 18. Unless otherwise specified, like numbers in FIGS. 1 to 18 indicate references to the same, similar, or corresponding elements throughout FIGS. 1 to 18. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of accumulator bags removeably secured to carrier sheets and methods for forming the same are hereinafter disclosed and described in detail with reference made to FIGS. 1 to 18.

Figure 1:
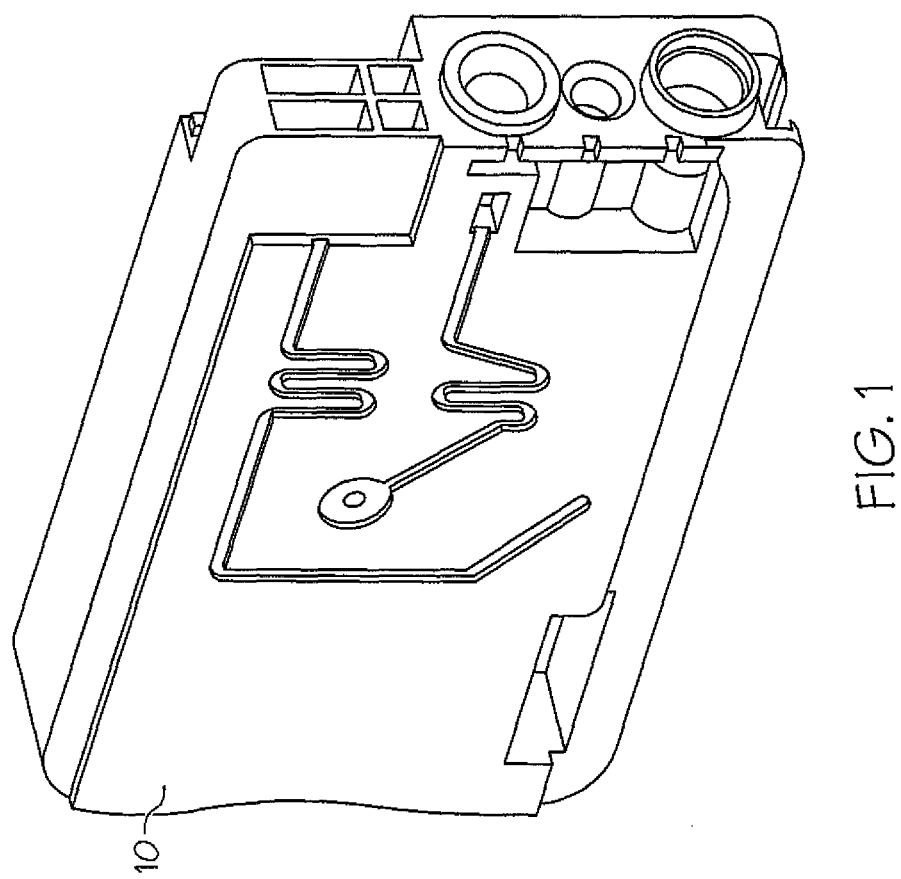
FIG. 1 is a perspective view of a printer cartridge for use with a digital or computer controlled printer.
Figure 2:
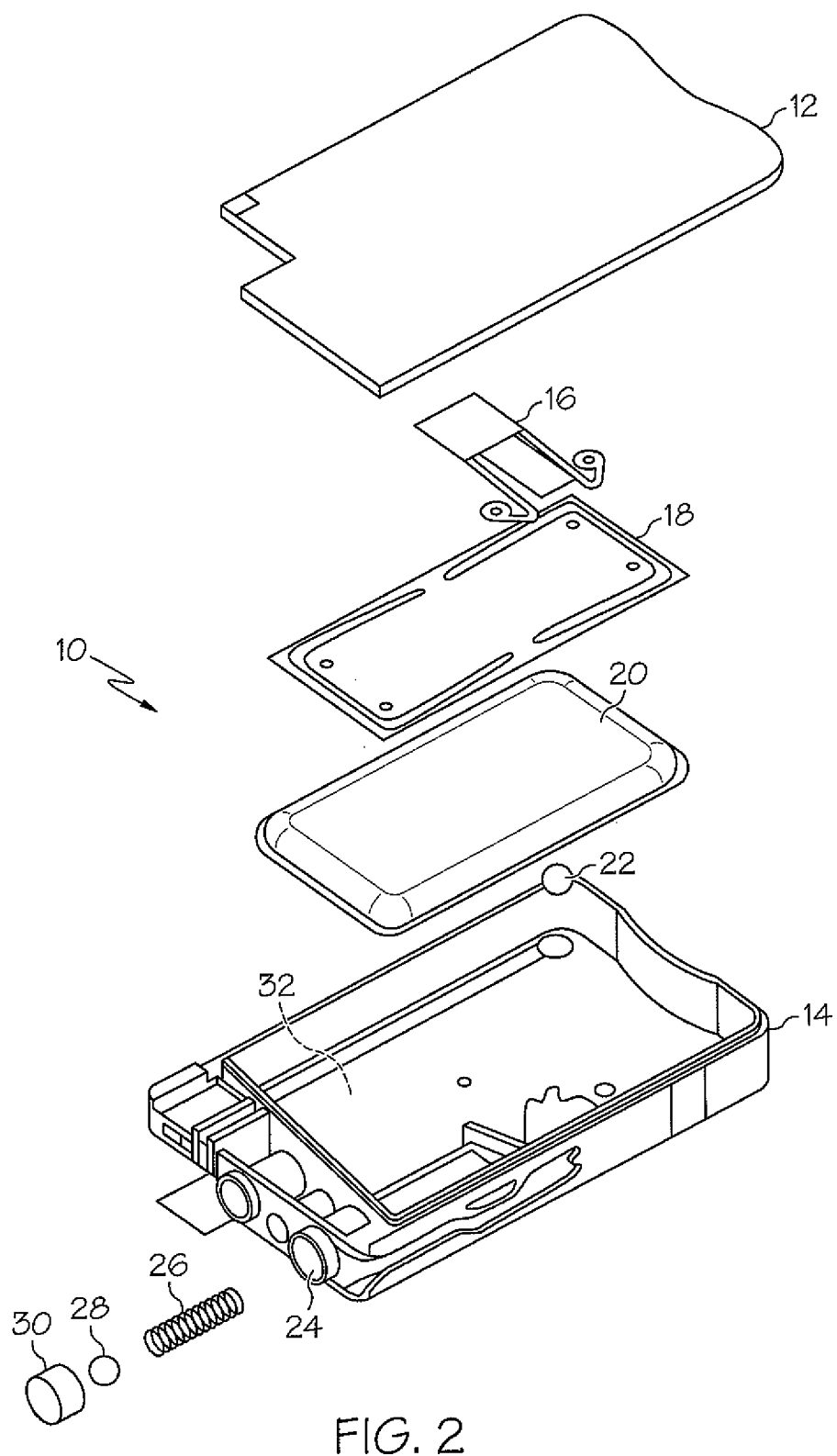
FIG. 2 is an exploded view of the printer cartridge of FIG. 1.

FIGS. 1 and 2 illustrate an exemplary embodiment of a printer cartridge 10. As shown in FIG. 2, the printer cartridge 10 can include a cover 12 and a housing 14 that can each be arranged to be coupled together to form a generally ridged exterior of the printer cartridge 10 and also provide for a cavity within the printer cartridge 10. The cavity within the printer cartridge 10 can be arranged to provide for the positioning of a number of components. In one example, a valve spring 16, an accumulator spring 18, an accumulator bag 20, and a check valve 22 can be positioned within the cavity of the printer cartridge 10. The printer cartridge 10 can further include an aperture 24 in the housing 14 and a spring 26, ball 28, and septum 30. The printer cartridge 10 can also include an ink reservoir 32 located within the housing 14 of the print cartridge 10.

When the print cartridge 10 is assembled, the valve spring 16 can be arranged to engage the cover 12 and the accumulator spring 18, and the accumulator spring 18 can be arranged to engage the valve spring 16 and the accumulator bag 20. As will be subsequently discussed, the accumulator bag 20 can be arranged to be pressurized with a gas such as air and can include an aperture or nozzle (not shown in FIG. 2) that engages the ink reservoir 32. The check ball 22 can be positioned at or in the nozzle to regulate the opening and closing of the nozzle. The check ball 22 can regulate the opening and closing of the nozzle such that the accumulator bag 20 can apply a pressure to the ink reservoir 32 positioned in the housing 14 of the print cartridge 10. It will be understood that the accumulator bag 20 can apply a constant pressure to the ink reservoir 32 so as to facilitate printing, and the accumulator bag 20 can also apply a different constant pressure to the ink reservoir 32 so as to encourage the ink not to leak or drop from the aperture 24 in the housing 14.

Figure 3:
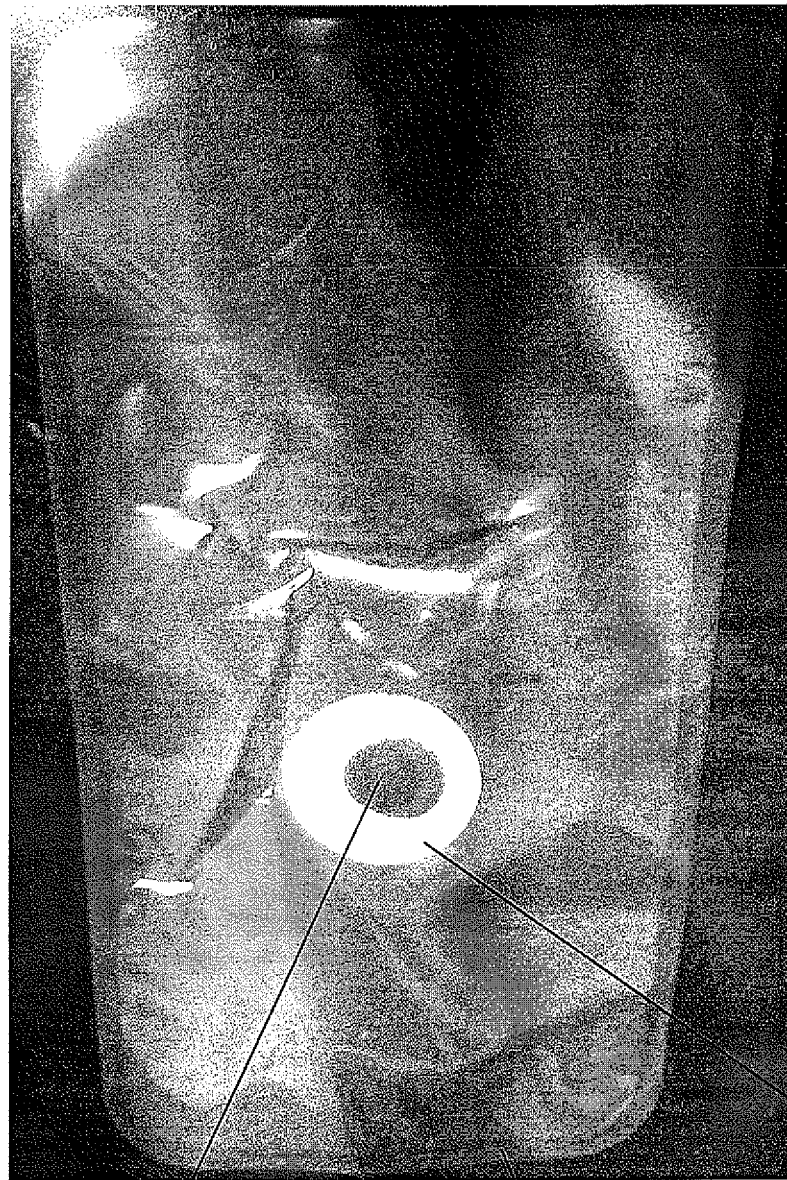
FIG. 3 is a photograph of an accumulator bag for use with a printer cartridge.
Figure 4:
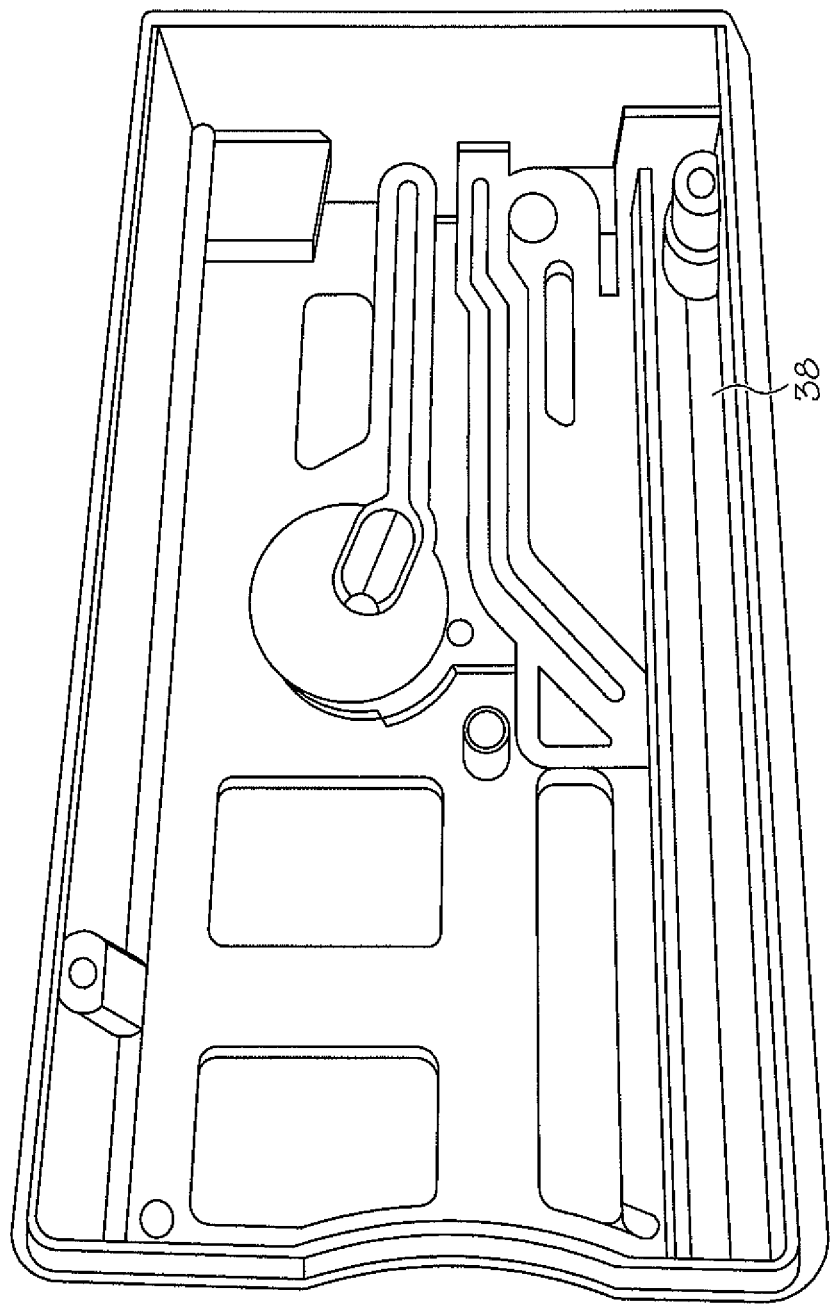
FIG. 4 is an illustration of a portion of the housing of a printer cartridge.
Figure 5:
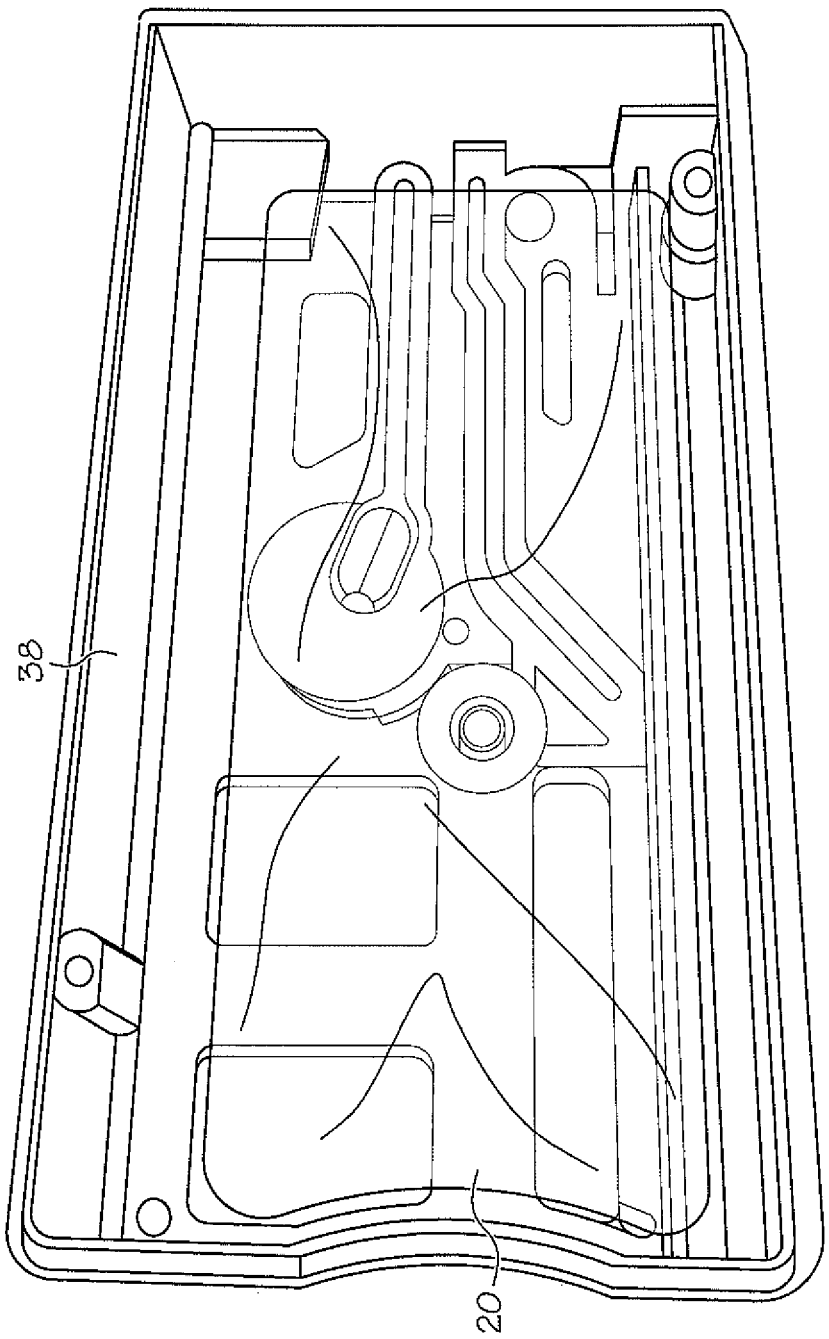
FIG. 5 is an illustration of the accumulator bag of FIG. 3 positioned in the portion of the housing of FIG. 4.

FIG. 3 is a photograph of an exemplary accumulator bag 20. As is shown, the accumulator bag 20 includes a nozzle 34 and an annular adhesive element 36. FIG. 4 is an illustration of a tray 38, and FIG. 5 is an illustration of the accumulator bag 20 positioned within the tray 38. In one example, the tray 38 can be a subcomponent of the housing 14 and can be arranged to accommodate and secure the accumulator bag 20 within the cavity of the printer cartridge 10 when the printer cartridge 10 is assembled. In one example, the nozzle 34 can comprise an aperture formed through the accumulator bag 20. The annular adhesive element 36 can be positioned around the nozzle 34 so that an aperture through the annular adhesive element 36 is generally concentric with the nozzle 34. The annular adhesive element 36 can include adhesive applied to both surfaces of the annular adhesive element 36. Such an arrangement facilitates securing the annular adhesive element 36 to the accumulator bag 20 so that the annular adhesive element 36 can be positioned around the nozzle 34. Such an arrangement also facilitates securing the accumulator bag 20 to other elements such as, for example, the tray 38. As shown in FIG. 5, the annular adhesive element 36 can be secured to the tray 38 so that the nozzle 34 generally aligns with an aperture in the tray 38. It will be understood that this aperture in the tray 38 can provide for a pathway for pressure from the accumulator bag 20 to be applied to the ink reservoir 32 of the printer cartridge 10.

To accommodate the need for accumulator bags in the printer cartridge industry, accumulator bags can be manufactured in large quantities. In one example, large quantities of accumulator bags 20 can be manufactured through multi-step methods. Such a multi-step method can begin with the raw materials that form the accumulator bags and annular adhesive elements and result in a matrix of accumulator bags removeably secured to a carrier sheet. The carrier sheet can be used to temporary hold the accumulator bags between the time the accumulator bags are manufactured and the time the accumulator bags are placed within printer cartridges during manufacture of the printer cartridges. It will be understood that temporarily securing a large quantity of accumulator bags to a carrier sheet can be useful in an assembly-line method of manufacturing printer cartridges.

Figure 7:
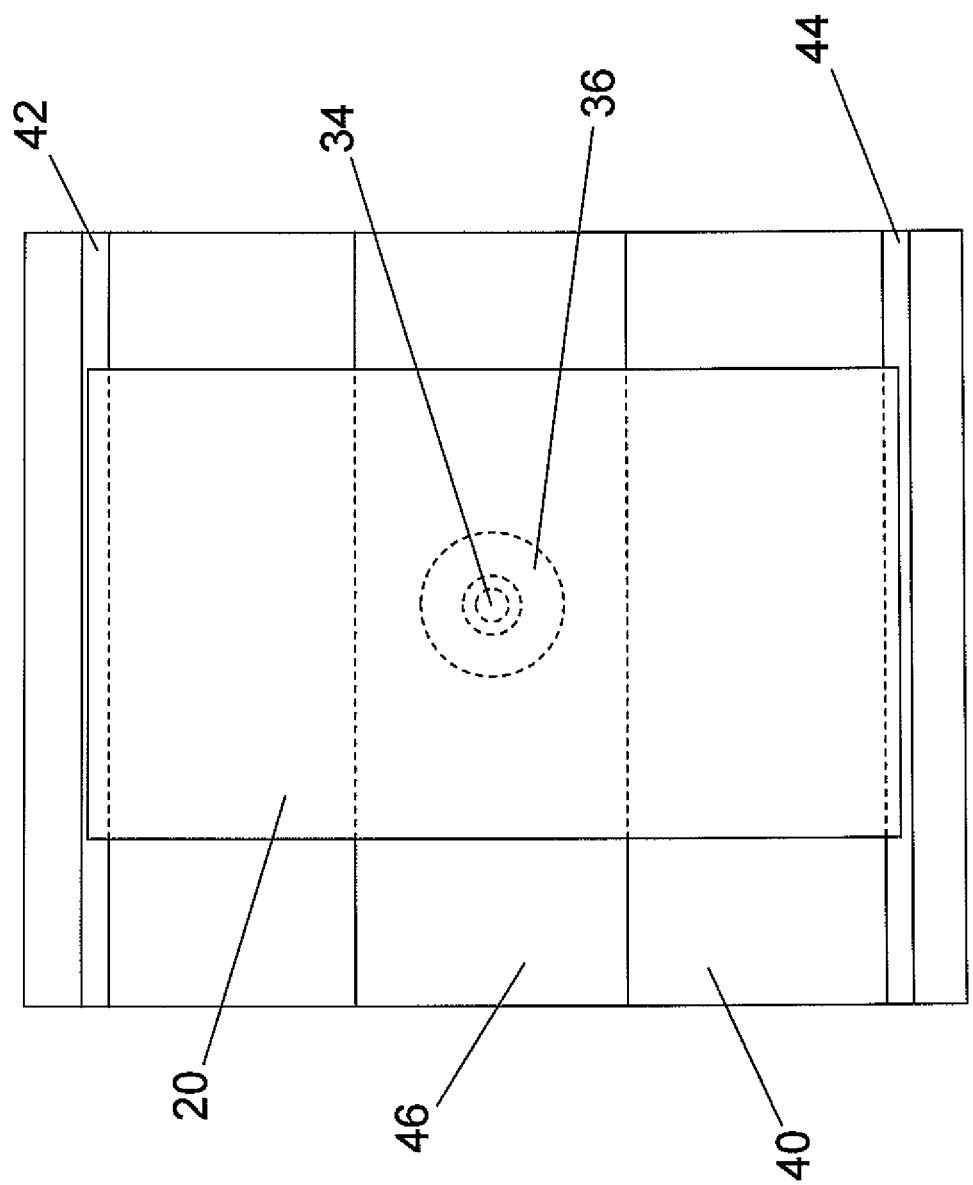
FIG. 7 is a schematic view of a accumulator bag removeably secured to the carrier sheet of FIG. 6.
Figure 8:
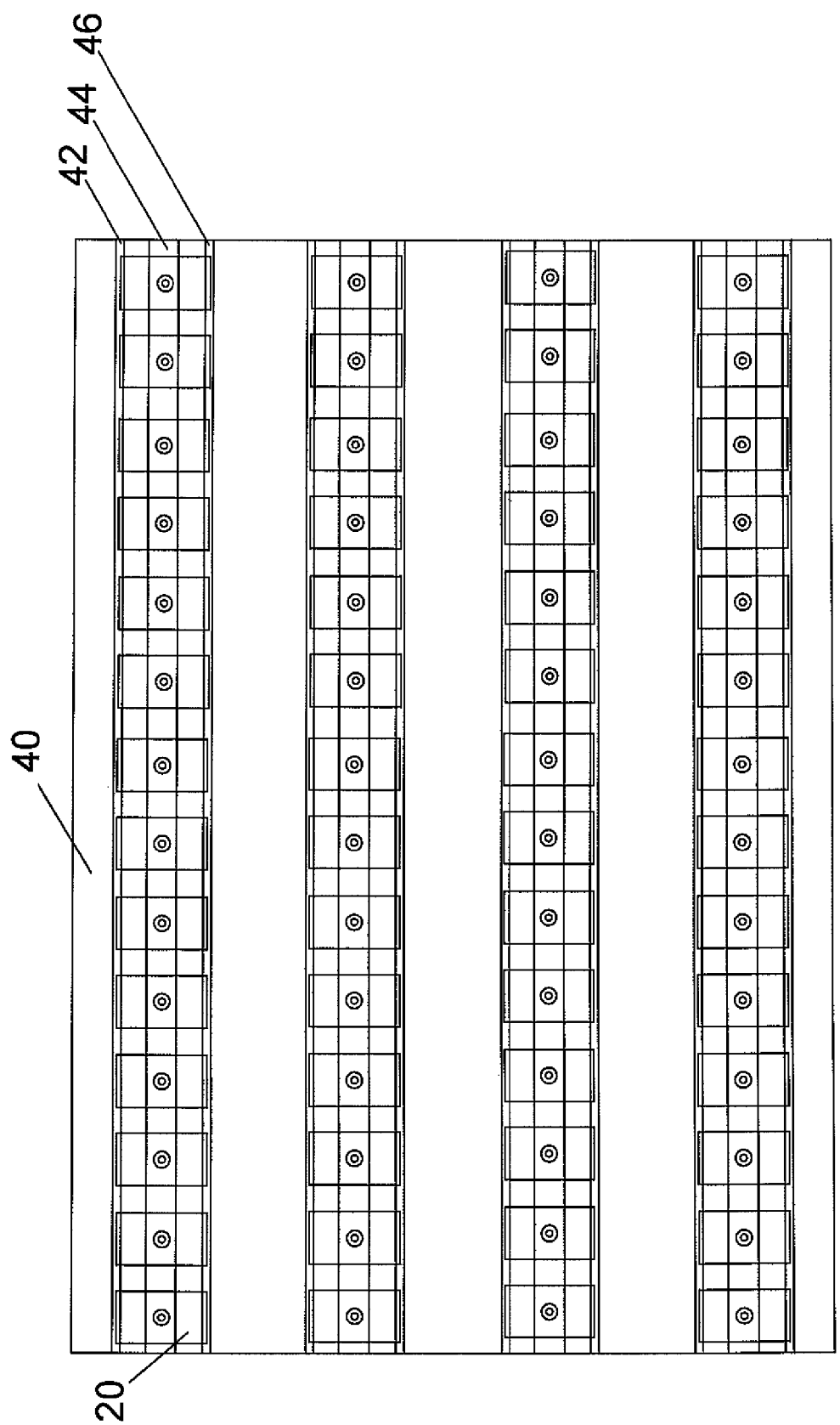
FIG. 8 is a schematic view a plurality of accumulator bags of FIG. 7 removeably secure to the carrier sheet of FIG. 6.

FIG. 6 schematically illustrates a carrier sheet 40. The carrier sheet 40 can include printed or striped areas that facilitate removeably securing accumulator bags 20 to the carrier sheet 40. For example, the carrier sheet 40 can include an upper adhesive stripe 42, a lower adhesive stripe 44, and a silicone stripe 46. Suitable adhesives for upper and lower adhesive stripes 42 and 44, respectively, include, but are not limited to, acrylic-based pressure sensitive adhesives, UV-cured acrylic-based pressure sensitive adhesives, solvent- and/or water-based acrylic adhesives, UV-cured solvent- and/or water-based acrylic adhesives, or suitable. In another embodiment, adhesive strips 42 and 44 can be formed of the same, or if so desired, different adhesive compositions. FIG. 7 schematically illustrates a detailed view of a single accumulator bag 20 manufactured to be removeably secured to a carrier sheet 40, and FIG. 8 schematically illustrates a plurality of accumulator bags 20 manufactured to be removeably secured to the carrier sheet 40. In one example, the term "removeably secured" can mean that the accumulator bag 20 is secured to the carrier sheet 40 in such a manner that the accumulator bag 20 will remain secured to the carrier sheet 40 during storage and transportation of the carrier sheet 40, but the accumulator bag 20 can be removed from the carrier sheet 40 by the application of force so that no damage is done to the accumulator bag 20 or the annular adhesive element 36.

Figure 6A:
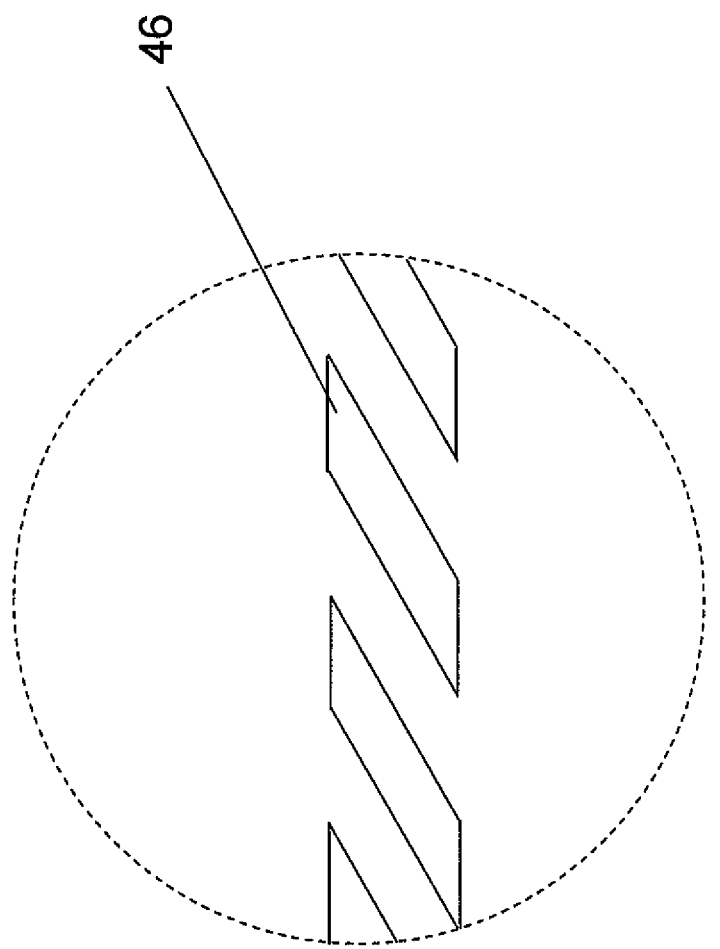
FIG. 6A is a detailed view depicting an adhesive stripe of the carrier sheet of FIG. 6.

FIG. 6 illustrates stripes 42, 44, 46 that can accommodate four rows of accumulator bags 20 removeably secured to the carrier sheet 40 (as shown in FIG. 8). As is shown in FIGS. 7 and 8, the upper portion of the accumulator bag 20 is positioned over the upper adhesive stripe 42 and the lower portion of the accumulator bag 20 is positioned over the lower adhesive stripe 44. Such positioning removeably secures the accumulator bags 20 to the carrier sheet 40. The upper adhesive stripe 42 and lower adhesive stripe 44 comprise an adhesive with a generally low peel adhesion and/or shear strength. This is to say that the adhesive will not prevent an accumulator bag 20 from being peeled away or sheared from the carrier sheet 40 when a relatively moderate force is applied to the accumulator bag 20. FIG. 6A is a detailed view of the lower adhesive stripe 44. In one example, the lower adhesive stripe 44 is applied to the carrier sheet 40 in sections that leaves gaps between each section. Such an arrangement is one method of providing the lower adhesive stripe 44 with generally low peel adhesion and shear strength, and, thus, provide from accumulator bags 20 to be removeably secured to the carrier sheet 40. It will be understood that the same or similar method can be applied to the upper adhesive stripe 42.

The silicone stripe 46 provides a surface that does not adhere well to adhesives. As is shown in FIG. 7, the accumulator bag 20 is positioned on the carrier sheet 40 such that the annular adhesive element 36 is facing the carrier sheet 40, and the annular adhesive element 36 contacts the silicone stripe 46. Because the annular adhesive element 36 generally has adhesive applied to both surfaces and the silicone stripe 46 does not adhere well to adhesives, the accumulator bag 20 remains removeably secured to the carrier sheet 40 and the accumulator bag 20 can be removed from the carrier sheet without damaging the annular adhesive element 36 or reducing its adhesive strength.

Figure 9:
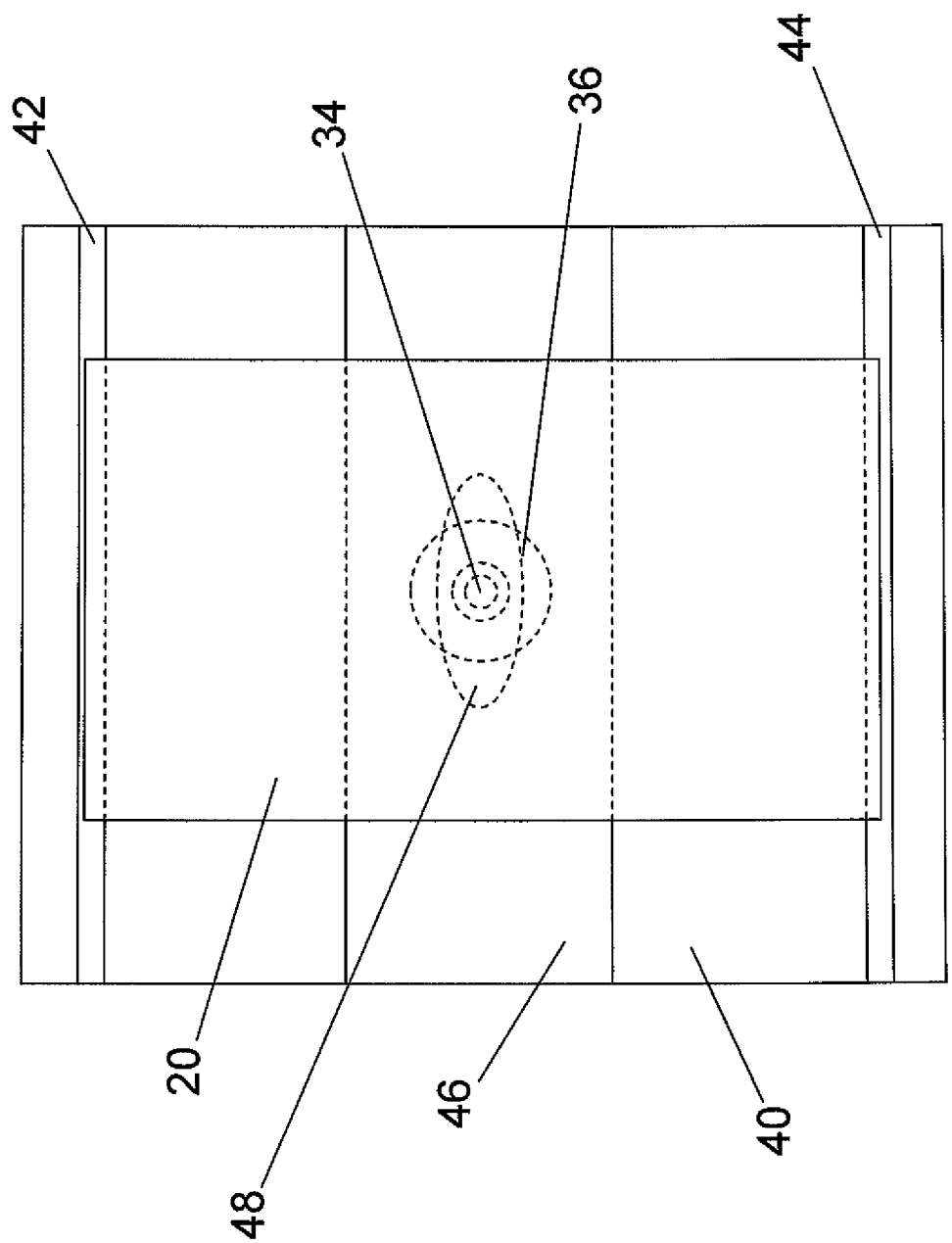
FIG. 9 is a schematic view of another accumulator bag removeably secured to the carrier sheet of FIG. 6.

Another example of an accumulator bag 20 is schematically illustrated in FIG. 9. In this example, a reinforcement element 48 is included around the nozzle 34. The reinforcement element 48 strengthens the area at and around the nozzle 34. Such reinforcement promotes the integrity of the area around the nozzle 34 during the manufacture of the accumulator bag 20, the removal of the accumulator bag 20 from the carrier sheet 40, the assembly of the accumulator bag 20 into the printer cartridge 10, and the use of the accumulator bag 20 during printing.

Figure 10:
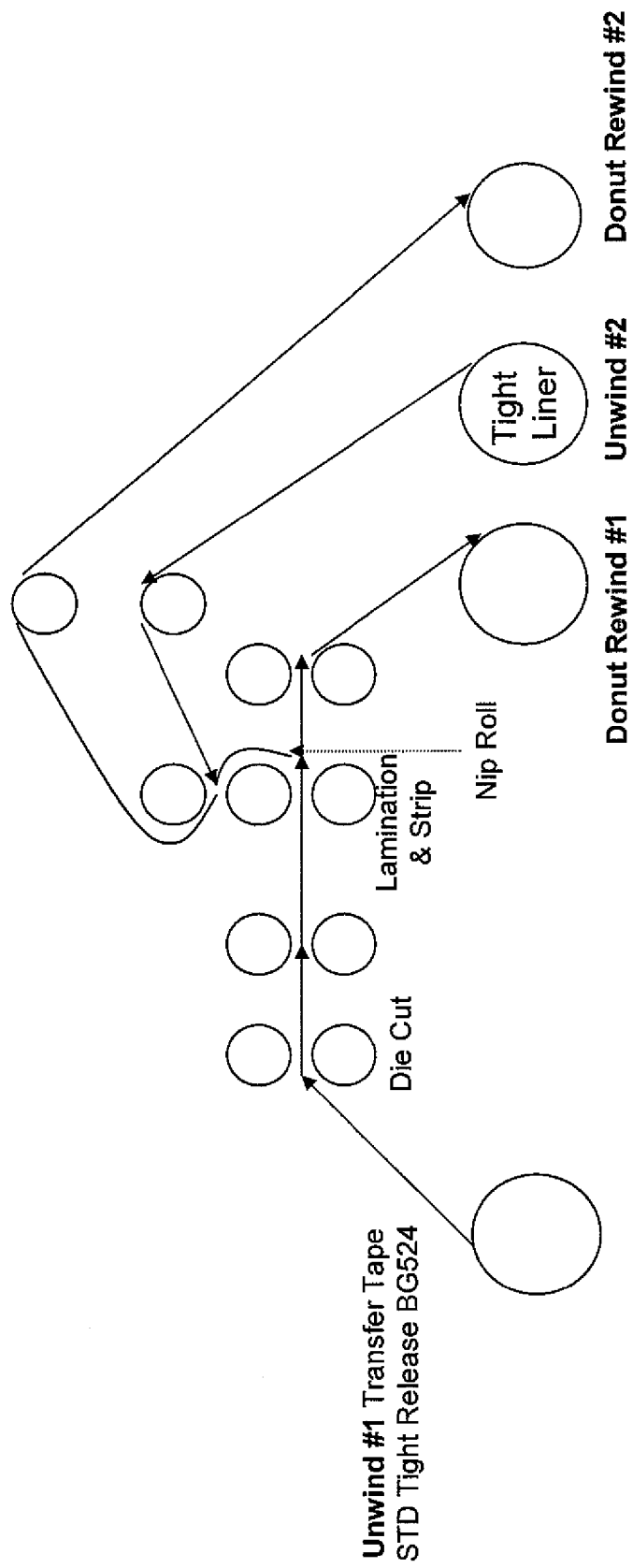
FIG. 10 is a schematic view depicting apparatus for preparing material for use in manufacturing annular adhesive elements.

FIGS. 10 to 17 schematically illustrate steps that can be used in methods of manufacturing accumulator bags 20, manufacturing carrier sheets 40, and removeably securing such accumulator bags 20 to such carrier sheets 40. FIG. 10 schematically illustrates preparing material for use in manufacturing the annular adhesive elements 36. As shown in FIG. 10, the method begins with an unwinding mechanism unwinding a transfer tape and feeding the transfer tape to one or more dies. The one or more dies can longitudinally cut the transfer tape into two lanes. Once cut into lanes, the lanes can be laminated and stripped. A liner or carrier web can be applied to the lanes and the lanes and carrier web can proceed through a series of rollers to a pair of winding mechanisms to be wound for later use. It will be understood that the material used to form annular adhesive elements can be manufactured as a double-sided adhesive material or adhesives can be added to both sides of a material during the manufacturing process. Suitable materials for the transfer tape portion include, but are not limited to, a PET film (e.g., a biaxially oriented PET film) or a biaxially oriented polypropylene (BOPP) film. In one embodiment, the film for the transfer tape is coated on at least one side, or even both sides, with at least one acrylic-rubber hybrid adhesive. In still another embodiment, either one side or both sides can have release liners covering any adhesive portion located thereon. In another embodiment, a suitable adhesive for the annular adhesive include, but are not limited to, acrylic-rubber hybrid adhesives or high performance solvent-based acrylic adhesives. In still another embodiment, the film material for use in constructing the transfer tape is a white film material.

Figure 11:
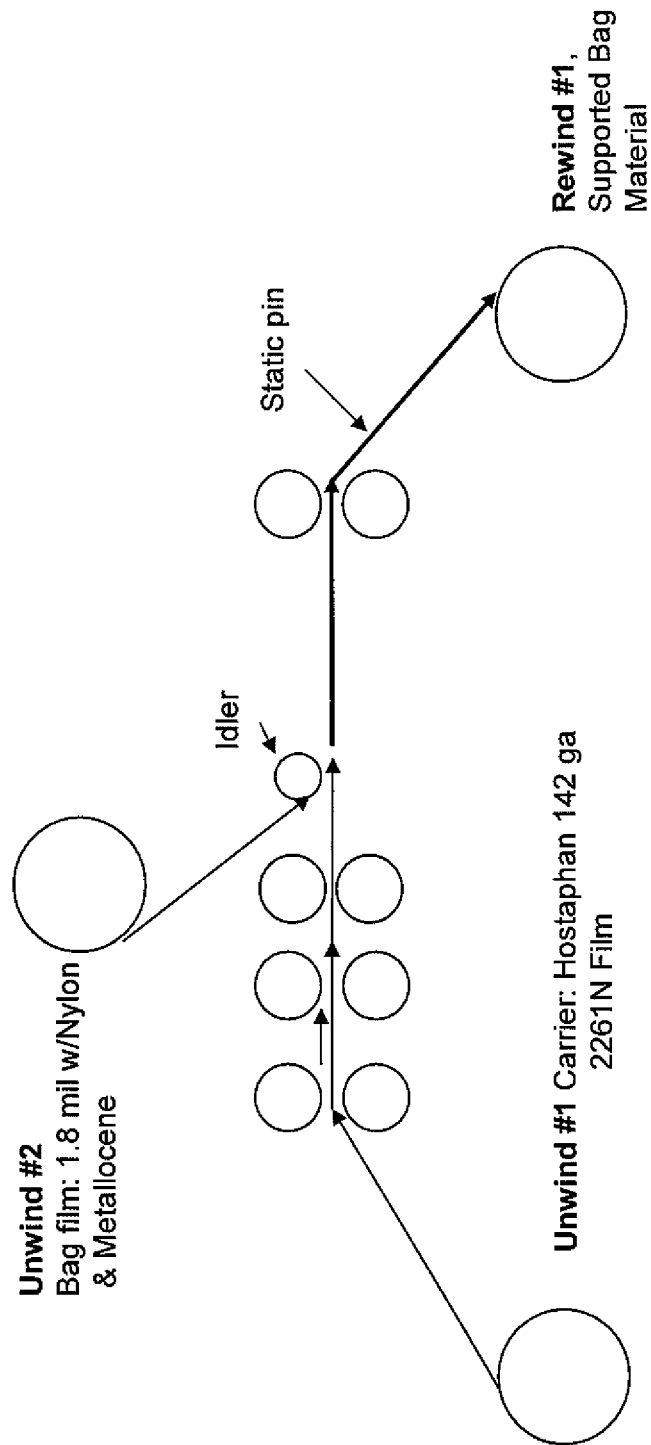
FIG. 11 is a schematic view depicting apparatus for preparing material for use in manufacturing accumulator bags.

FIG. 11 schematically illustrates preparing material for use in manufacturing the accumulator bags 20. In the method shown in FIG. 11, film material is statically pinned to a carrier web. The method begins with an unwinding mechanism unwinding a carrier web. In one example, the carrier web can be a polyester film that has a generally high strength, is durable, is dimensionally stable, and is resistant to chemicals. For example, the carrier web can be polyethylene terephthalate ("PET"). The carrier web can be unwound and fed downstream through a series of rollers. A second unwinding mechanism unwinds a polymer film that is used to manufacture the accumulator bags 20. In one example, the polymer film can comprise nylon and metallocene and can be approximately 1.8 mils thick. The polymer film engages an idler that places the polymer film in contact with the carrier web. The polymer film and carrier web proceed through at least one additional pair of rollers, and the polymer film is statically pinned to the carrier web. The statically pinned polymer film and carrier web then proceed to a winding mechanism to be wound for later use.

Figure 12:
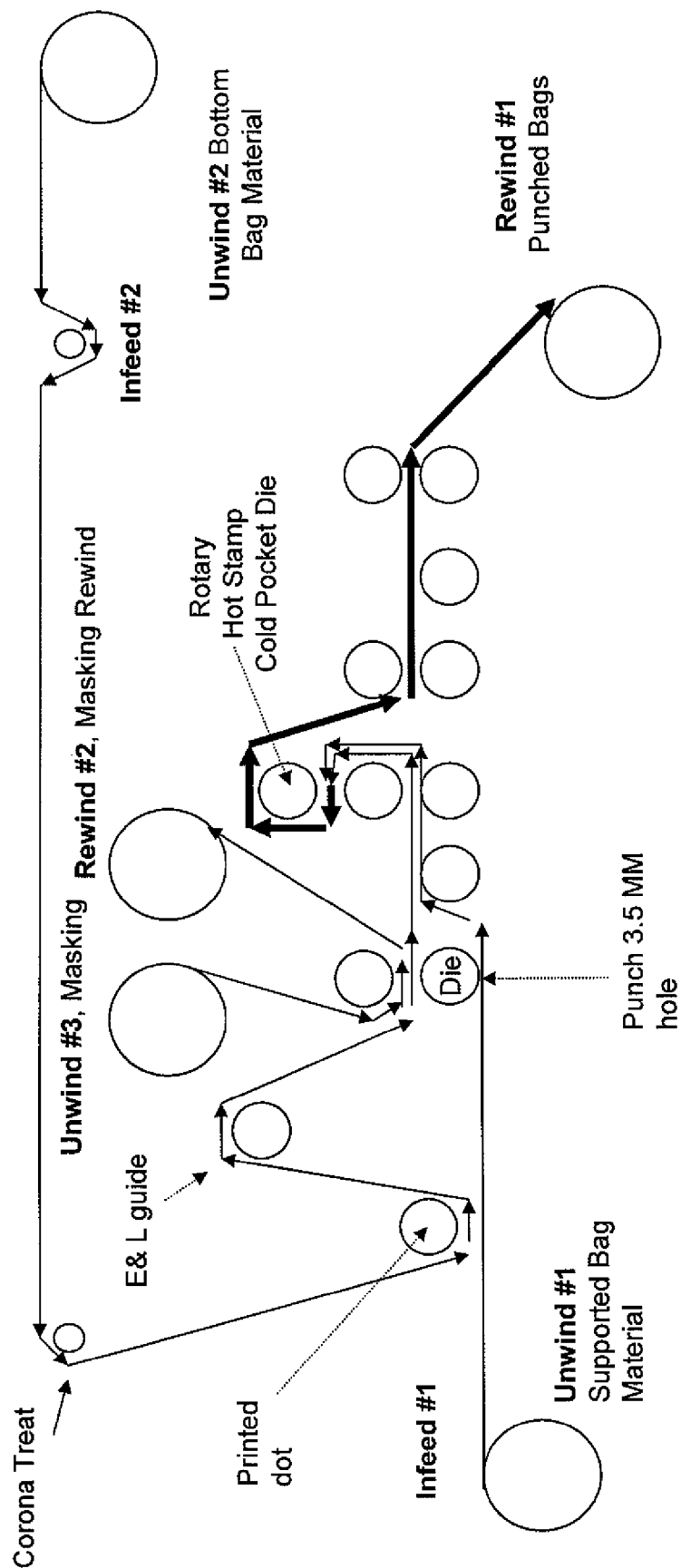
FIG. 12 is a schematic view depicting apparatus for manufacturing accumulator bags.

FIG. 12 schematically illustrates a method for manufacturing the accumulator bags 20. In one example, the method includes forming the nozzle 34 of the accumulator bags, welding seams that define accumulator bags 20, and printing at least one fiducial marker onto the accumulator bags 20. A first unwinding mechanism unwinds the statically pinned polymer film and carrier web formed by the method illustrated in FIG. 11 and moves it toward a punch die. The polymer film will be used as one of the panels of the final accumulator bag 20. The punch die forms an aperture in the polymer film that will serve as the nozzle 34 for the accumulator bag 20. In one example, the aperture can be approximately 3.5 millimeters in diameter. A second unwinding mechanism unwinds a second polymer film that will be used as a second panel of the final accumulator bag 20. The second polymer film progresses through a corona treatment and a fiducial marker is printed onto the second polymer film. The fiducial marker can be a visual indicator such as a dot.

The second polymer film can be engaged with a masking material. The second polymer film is then placed in contact with the polymer film that includes the nozzle. Once in contact with one another, the polymer films proceed to a welding die that heat seals the polymer films together along seams that define the dimensions of a pressurizable chamber. In one example, the welding die can be a rotary hot stamp die with a cold pocket to heat seal seams that form the pressurized chamber there between and that defines the accumulator bag 20. The welded polymer films proceed to a winding mechanism to be wound for later use. In one embodiment, the various pieces or material that are utilized to construct an accumulator bag in accordance with the present invention is formed from a flexible material. Suitable flexible materials include, but are not limited to, linear low-density polyethylene (LLDPE), low-density polyethylene (LDPE), ethylene vinyl acetate (EVA), a nylon film with EVOH (i.e., metallocene), or any suitable combinations thereof. In another embodiment, suitable flexible materials include, but are not limited to, linear low-density polyethylene (LLDPE), low-density polyethylene (LDPE), ethylene vinyl acetate (EVA), or any suitable combinations thereof with any of these materials further contain at least one EVOH layer. In another embodiment, any polymer material can be utilized for the various portions of the accumulator bags of the present invention so long as such polymer material is flexible as is defined by having an elongation over 100 percent and/or a modulus of less than 250 ksi.

To facilitate inspection of the heat seals of the polymer films formed by the welding process, a thermally sensitive material can be included in one or both of the polymer films. Such a thermally sensitive material can be applied on or coextruded with one of the polymer films. A thermally sensitive material can be arranged to generate a visual marker when exposed to heat. In one example, the thermally sensitive material can be arranged to change color upon the application of heat. Various suitable thermally sensitive materials are known to those of skill in the art. As such, for the same of brevity, a detailed discussion herein is omitted. Such an arrangement provides for the visual inspection of heat sealed areas after the welding of the polymer films. A visual inspection can verify whether the heat seal is continuous, the value of the dimensions of the heat seal, the size and shape of the pressurizable chamber, and other such properties.

Figure 13:
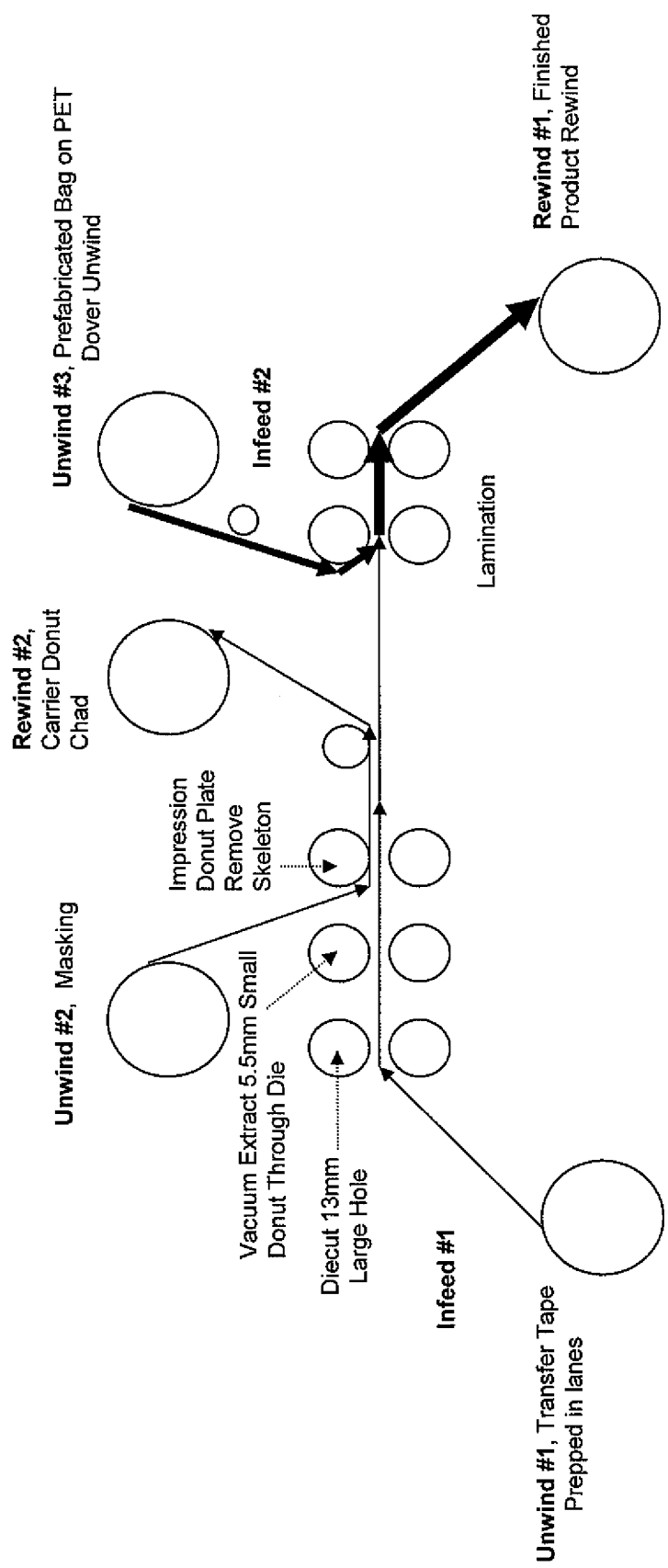
FIG. 13 is a schematic view depicting apparatus for manufacturing annular adhesive elements.

FIG. 13 schematically illustrates a method for manufacturing annular adhesive elements 36 and positioning the annular adhesive elements 36 onto the accumulator bags 20. One unwinding mechanism unwinds the lanes and carrier web formed by the method illustrated in FIG. 10. The lanes proceed through a series of dies that cut the outer perimeter and inner aperture of the annular adhesive elements 36. In one example, the outer perimeter is approximately 13 millimeters in diameter and the aperture is approximately 5.5 millimeters in diameter. A second unwinding mechanism unwinds a masking material that engages the die cut lanes. A plate facilitates the engagement of the masking material and the die cut lanes. This engagement removes the unwanted portions of the lanes and carrier web, which are moved to a winding mechanism to be wound and discarded. A third unwinding mechanism unwinds the accumulator bags 20 formed by the method illustrated in FIG. 12. The accumulator bags 20 and the annular adhesive elements 36 are engaged and the annular adhesive elements 36 are adhered and secured to the accumulator bags 20 and wound by a winding mechanism for later use.

Figure 14:
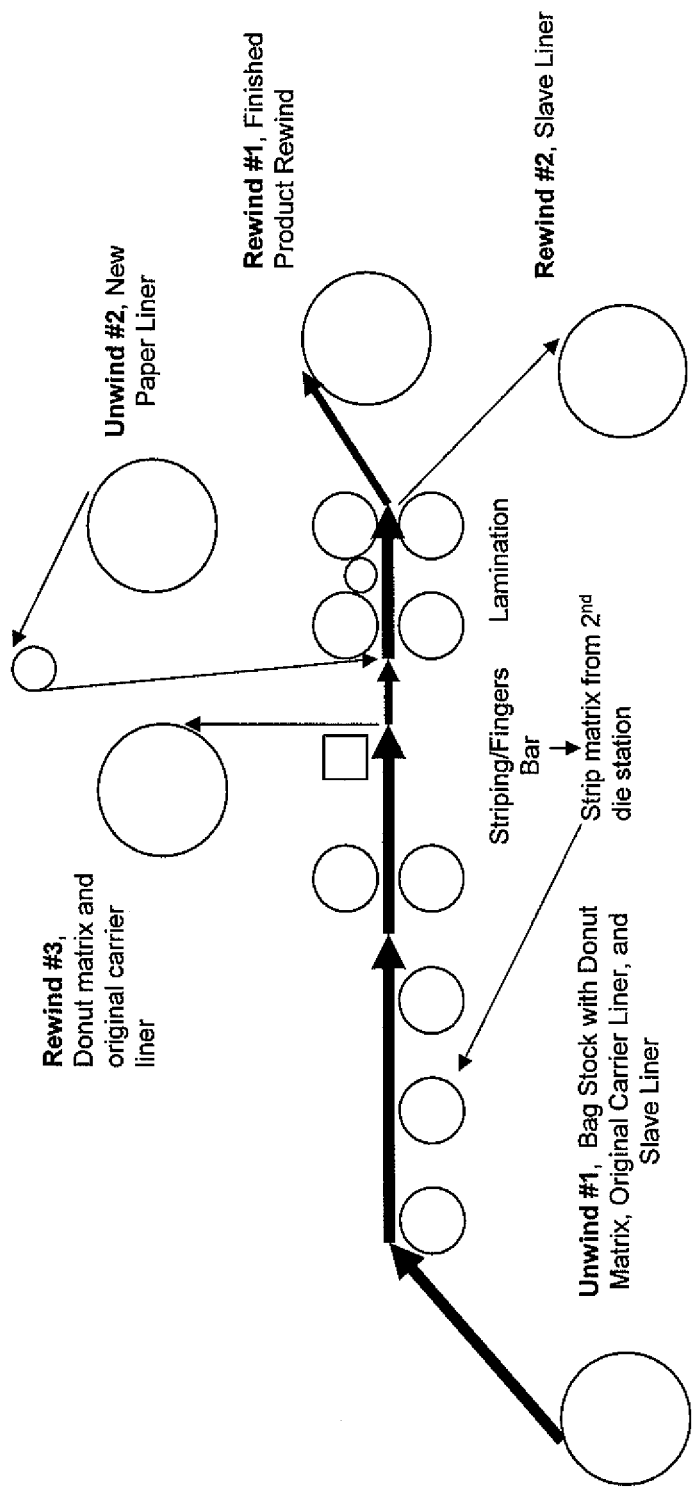
FIG. 14 is a schematic view depicting apparatus for assembling the accumulator bags with the carrier sheet.

FIG. 14 schematically illustrates a method for assembling the accumulator bags 20 with the carrier sheet 40. One unwinding mechanism unwinds the accumulator bags 20 and annular adhesive elements 36 formed by the method illustrated in FIG. 13. The accumulator bags 20 proceed through a series of dies that remove original carrier webs or liners, unwanted transfer tape material, etc. A number of mechanisms can be used to remove unwanted materials such as, for example, stripper or finger bars. The unwanted materials proceed to a winding mechanism to be wound and discarded. A second unwinding mechanism unwinds the carrier sheet 40. The carrier sheet 40 can have areas preprinted with adhesives and/or silicone. Alternatively, areas of the carrier sheet 40 can be printed after unwinding and prior to engagement with the accumulator bags 20. The carrier sheet 40 and accumulator bags 20 proceed through a series of lamination rollers to removeably secure the accumulator bags 20 to the carrier sheet 40 as shown for example in FIG. 8. Once past the lamination rolls, the carrier sheet 40 with the accumulator bags 20 proceed to a winding mechanism for winding and later use such as for use on an assembly line that manufactures finished printer cartridges. Any additional unneeded liners or carrier webs can be directed to a second winding mechanism to be wound and discarded.

Figure 15:
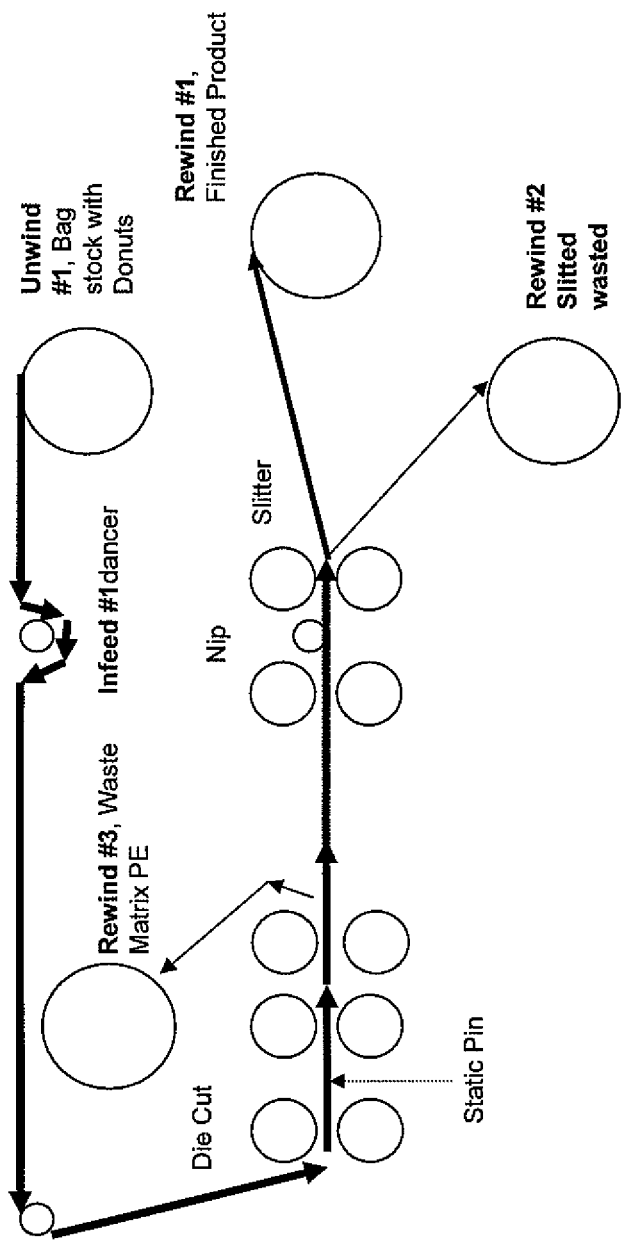
FIG. 15 is a schematic view depicting apparatus for another method for manufacturing accumulator bags.

FIG. 15 schematically illustrates another method for manufacturing accumulator bags 20. After the accumulator bags 20 have been welded as illustrated in FIG. 12, the excess polymer film material can be removed (i.e., the polymer material between the welds of adjacent accumulator bags 20). One unwinding mechanism unwinds the accumulator bags 20 that include the annular adhesive elements 36. A dancer pulley can be used to maintain an appropriate tension on the accumulator bags 20. The accumulator bags 20 are moved through a series of dies that can cut the material between the welds of adjacent accumulator bags 20. Nip rollers, splitters, and other such mechanisms can be used to separate the accumulator bags 20 from the excess polymer film material. A first winding mechanism can wind the accumulator bags 20 for later use, and a second winding mechanism can wind the excess polymeric film material to be later discarded.

Figure 16:
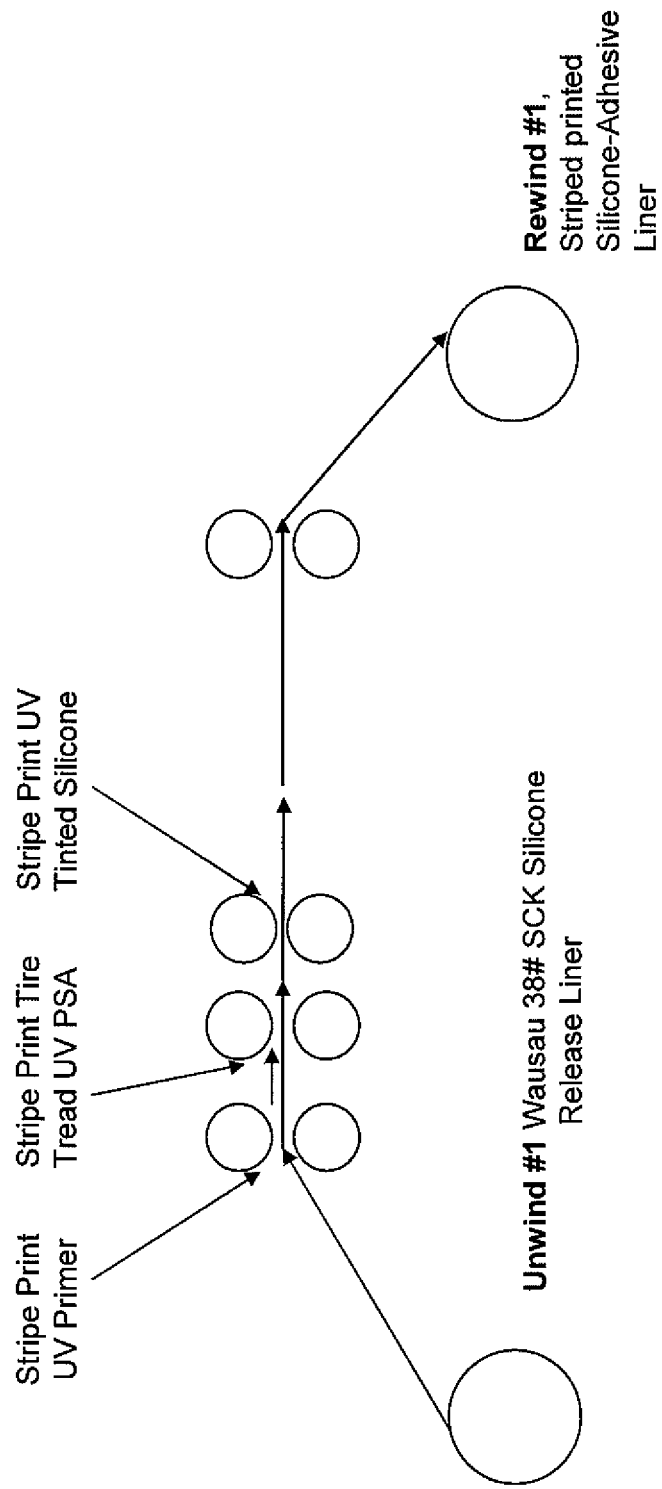
FIG. 16 is a schematic view depicting apparatus for printing adhesive and silicone stripes on a base sheet to form carrier sheets.

FIG. 16 schematically illustrates a method for printing or otherwise applying adhesive and silicone stripes to the carrier sheet 40. An unwinding mechanism unwinds the carrier sheet 40, and the carrier sheet 40 proceeds through a series of rollers where ultraviolet primer is applied and the adhesive material and silicone is printed into stripes as shown in FIG. 6. The printed carrier sheet 40 is then moved to a winding mechanism for winding and later use.

Figure 17:
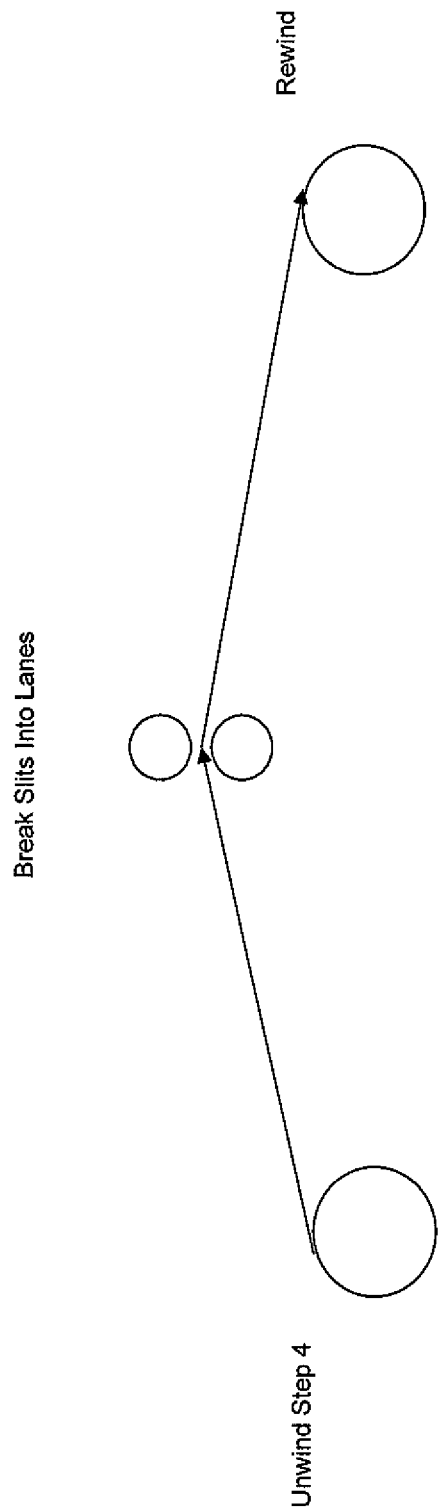
FIG. 17 is a schematic view depicting apparatus for cutting carrier sheets and accumulator bags into lanes.

FIG. 17 schematically illustrates a method further processing a carrier sheet 40 that includes a plurality of removeably secured accumulator bags 20 into lanes. The method includes cutting the carrier sheet 40 into lanes. An unwinding mechanism unwinds the carrier sheet 40 and accumulator bags 20 produced by the method illustrated in FIG. 12. The carrier sheet 40 proceeds through rollers or dies that slit or break the carrier sheet 40 into lanes. The lanes can be cut so that each lane includes a single or double row of accumulator bags 20. The lanes are then moved to a winding mechanism for winding and later use.

As described herein, accumulator bags can be secured to printer cartridges by annular adhesive elements. In an alternative embodiment, accumulator bags can be arranged so that an accumulator bag can be laser welded to a housing of a printer cartridge. Because accumulator bags are used to apply pressure to ink reservoirs, a nozzle of an accumulator bag and the housing of a printer cartridge can be hermetically sealed to facilitate such application of pressure. Such a seal can result in good performance of the accumulator bag because it provides for no or minimal leaking during the pressurizing of the ink reservoir. In addition, such a seal can provide a barrier to various solvents, water, emulsifiers, pH additives, etc. that can be present in the ink or generally in the printer cartridge.

Figure 18:
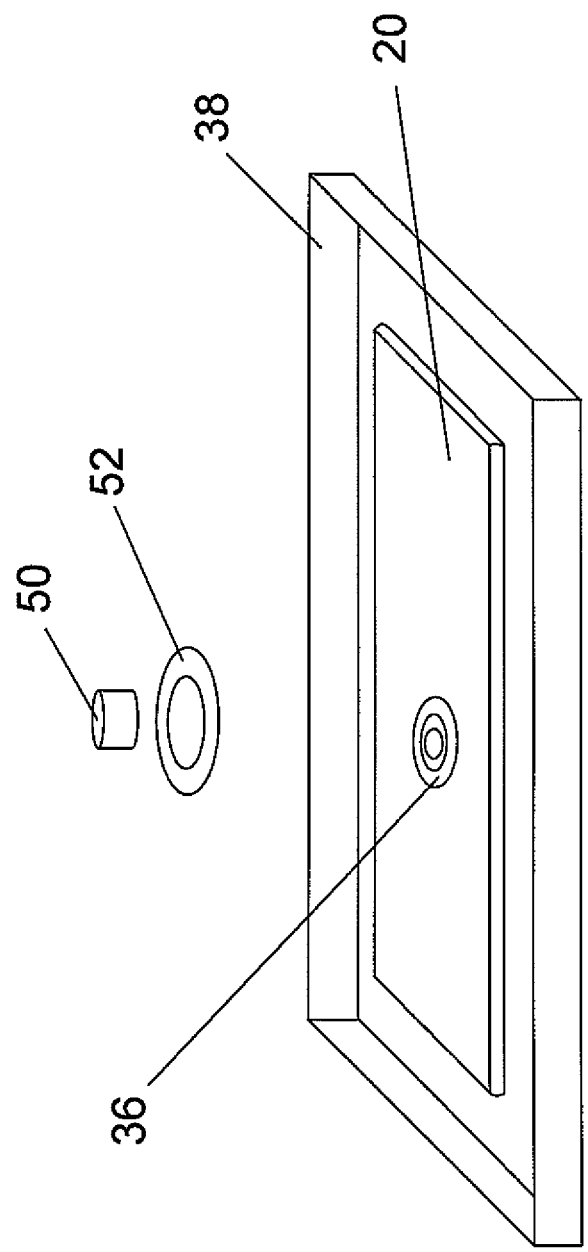
FIG. 18 is a schematic view depicting apparatus for laser welding an accumulator bag to the housing of a printer cartridge.

In one example, an accumulator bag 20 can be positioned in a tray 38 of the printer cartridge 10 as shown in FIG. 5. As schematically illustrated in FIG. 18, the annular adhesive element 36 can be arranged to secure the accumulator bag 20 in position to be laser welded to the tray 38. The accumulator bag 20 can be positioned so that its nozzle is positioned above an aperture in the tray 38. A laser source 50 is positioned above the accumulator bag 20. A masking element 52 is positioned between the laser source 50 and the accumulator bag 20 to control how and where the laser engages the accumulator bag 20 and tray 38. In one example, the laser can be used to fuse the material of the accumulator bag 20 to the tray 38 and form a seal around the nozzle and the aperture in the tray 38. In another example, a heat or light sensitive compound can be applied to the accumulator bag 20 or tray 38 to facilitate the forming of a seal by the laser source 50. Such heat or light sensitive compound can be arranged to react to engagement by the laser to facilitate welding. In another example, the accumulator bag 20 can be partially inflated during welding with the laser source 50. In another example, ultrasonic welding can be used to fuse or weld the bag 20 to the tray 38.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

What is claimed is:

1. An apparatus for manufacturing accumulator bags and removably securing the accumulator bags to a carrier sheet comprising:

(a) at least one first unwinder designed to unwind at least one first length of bag material comprising at least one layer of polymer film joined with at least one carrier layer;

(b) at least one die designed to create multiple openings at evenly spaced intervals in the at least one first length of bag material, wherein each of the multiple openings in the at least one first length of bag material will individually serve as a nozzle for an accumulator bag;

(c) at least one second unwinder designed to unwind at least one second length of bag material comprising at least one layer of polymer film joined with at least one carrier layer;

(d) at least one heat sealing unit designed to join the first length of bag material to the second length of bag material thereby creating a chain of two or more accumulator bags, where each accumulator bag has an individual pressurizable chamber formed therein; and (e) at least one unwinding mechanism for unwinding a carrier sheet to proceed through at least one lamination roller to removably secure the accumulator bags to the carrier sheet.

2. The apparatus of claim 1, wherein the apparatus further comprises at least one marking device designed to place at least one indicia on at least one surface of one of the first and/or second bag materials.

3. The apparatus of claim 1, wherein either one or both of the first bag material and the second bag material is formed from a nylon film.

4. The apparatus of claim 1, wherein either one or both of the first bag material and the second bag material is formed from a nylon and metallocene film.

5. The apparatus of claim 1, wherein either one or both of the first bag material and the second bag material further include therein at least one thermally sensitive compound.

6. The apparatus of claim 1, wherein the carrier sheet further comprises at least one adhesive area to removeably secure the accumulator bags to the carrier sheet.

7. The apparatus of claim 6, wherein the accumulator bags further comprise an adhesive element and the carrier sheet further comprises a silicone stripe such that the adhesive element at least partially contacts the silicone stripe as the accumulator bags are removeably secured to the carrier sheet.

8. The apparatus of claim 6, wherein the adhesive area of the carrier sheet is pressure sensitive.

9. The apparatus of claim 6, wherein the adhesive area of the carrier sheet is UV-cured.

10. The apparatus of claim 1, further comprising a winding mechanism to wind unwanted material from at least one of the first length of bag material, the second length of bag material and the carrier sheet.

11. An apparatus for manufacturing accumulator bags and removably securing the accumulator bags to a carrier sheet comprising:

(a) at least one first unwinder designed to unwind at least one first length of bag material comprising at least one layer of polymer film joined with at least one carrier layer;

(b) at least one die designed to create multiple openings at evenly spaced intervals in the at least one first length of bag material, wherein each of the multiple openings in the at least one first length of bag material will individually serve as a nozzle for an accumulator bag;

(c) at least one second unwinder designed to unwind at least one second length of bag material comprising at least one layer of polymer film joined with at least one carrier layer;

(d) at least one heat sealing unit designed to join the first length of bag material to the second length of bag material thereby creating a chain of two or more accumulator bags, where each accumulator bag has an individual pressurizable chamber formed therein; and (e) at least one winding mechanism to wind unwanted material from at least one of the first length of bag material, the second length of bag material and the carrier sheet.

12. The apparatus of claim 11, further comprising at least one unwinding mechanism for unwinding a carrier sheet to removably secure the accumulator bags to the carrier sheet.

13. The apparatus of claim 12, wherein the carrier sheet further comprises at least one adhesive area to removeably secure the accumulator bags to the carrier sheet.

14. The apparatus of claim 12, wherein the accumulator bags further comprise an adhesive element and the carrier sheet further comprises a silicone stripe such that the adhesive element at least partially contacts the silicone stripe as the accumulator bags are removeably secured to the carrier sheet.

15. The apparatus of claim 12, wherein the adhesive area of the carrier sheet is pressure sensitive.

16. The apparatus of claim 12, wherein the adhesive area of the carrier sheet is UV-cured.

* * * * *